(No Model.)

C. H. KOCK.
CAR AXLE BOX.

No. 331,893. Patented Dec. 8, 1885.

Witnesses:
Frank J. Blanchard
Harris W. Huehl

Inventor:
Christian H. Kock
By Wm H Lotz & Co.
Attorneys.

UNITED STATES PATENT OFFICE.

CHRISTIAN H. KOCK, OF AVOCA, IOWA, ASSIGNOR OF THREE-FOURTHS TO E. F. MULLOY, OF COOK COUNTY, AND GUSTAV A. WOOLLEY, MICHAEL McDERMOTT, AND W. D. O'BRIEN, OF CHICAGO, ILLINOIS.

CAR-AXLE BOX.

SPECIFICATION forming part of Letters Patent No. 331,893, dated December 8, 1885.

Application filed June 8, 1885. Serial No. 167,970. (No model.)

*To all whom it may concern:*

Be it known that I, CHRISTIAN H. KOCK, a citizen of the United States of America, residing at Avoca, in the county of Pottawattamie and State of Iowa, have invented certain new and useful Improvements in Lubricators for Car-Axle Journal-Boxes, of which the following is a specification, reference being had therein to the accompanying drawings.

My invention relates to certain improvements in lubricators for car-axles.

The object it has in view is to provide a lubricator which will constantly supply the lubricant to the journal of the axle, which will be simple in construction, and readily placed in position in the axle-box.

To the accomplishment of the above, the invention consists in providing the lubricating-roller with a spiral groove, in which the lubricant-carrier is mounted, in the novel means for holding such carrier in position, and in mounting such a roller in spring-bearings.

Figure 1:
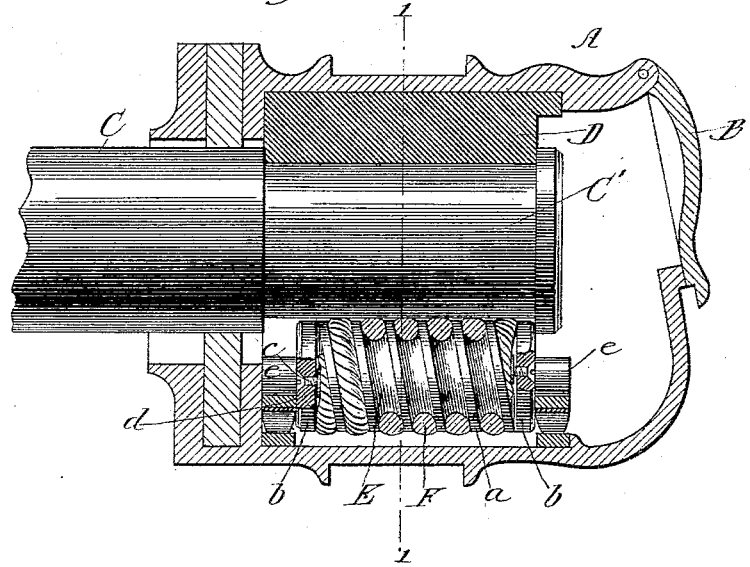
Figure 2:
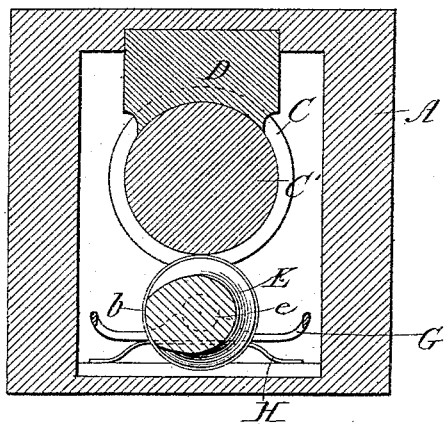
Figure 3:
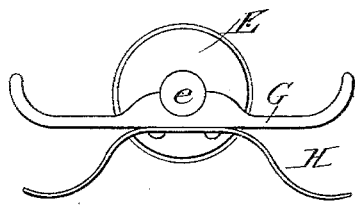

Reference will be made to the accompanying drawings, in which Figure 1 is a sectional view through a car-axle box; Fig. 2, a section on line 1 1 of Fig. 1, and Fig. 3 an end view of the lubricator detached.

Like letters refer to like parts in each view.

A represents a car-axle box, and B a hinged cover for an end opening thereof, through which the lubricator and lubricant are inserted; C is the car-axle, with journal C', which enters the axle-box, and D is the journal-box—all the parts thus far described being of any well-known and suitable construction.

E represents my improved anti-friction roller and lubricator. This roller is formed of any suitable material, and is formed with a suitable spiral groove, a, which at each end is ended by a circumferential flange, b.

F represents a rope, formed of some material adapted to carry the lubricant with which it is soaked and to impart it to the journal, as will be described.

To secure rope F in position, one end is placed in groove a at one extremity, and pressure applied through the medium of a screw, e, passed through the flange b at that end, said screw carrying a plate, d, at its inner end. The rope, being thus securely held in place at one end, is wound in the groove tightly, and secured at the opposite end in a similar manner.

In the drawings, e represents the journals of roller E, which have bearings in a frame, G. This frame is mounted at each end upon a spring-leg, H, secured at its center to the frame.

Because of the construction last above described, it will be seen that if the roller E rests upon the frame G, but not in the bearings formed for the journals of said roller, the axle journal-box may be inserted and the roller then forced to its proper position, the spring-supports H allowing of a sufficient depression of frame G for this purpose.

It will be understood that the journal C' rests upon the roller E, and the rope F wound therearound, a perfect anti-friction roller for such journal being thus provided, and because of the fact that such rope is thoroughly soaked with the lubricant a perfect lubricator is also obtained.

What I claim is—

1. The combination, with a roller for distributing lubricants, formed with a spiral groove, of the lubricant-carrier wound in such groove, as set forth.

2. The combination, with a roller mounted in spring-bearings and formed with a spiral groove, of a lubricant-carrier wound in such groove, as set forth.

3. The combination, with a roller for distributing lubricants, formed with a spiral groove, of a lubricant-carrier wound in such groove, and suitable screws and plates secured thereto for holding such lubricant-carrier in place, as set forth.

In testimony whereof I affix my signature in presence of two witnesses.

CHRISTIAN H. KOCK.

Witnesses:
M. J. CLAGETT,
HARRIS W. HUEHL.